United States Patent [19]

Koops et al.

[11] Patent Number: 5,824,397

[45] Date of Patent: Oct. 20, 1998

[54] USE OF LABELS FOR THE LABELLING OF RUBBER PARTS, IN PARTICULAR TIRES

[75] Inventors: Arne Koops, Hamburg; Klaus Külper, Pinneberg; Ulrich Ofer; Christian Kreft, both of Hamburg, all of Germany

[73] Assignee: Beiersdorf AG, Hamburg, Germany

[21] Appl. No.: 699,276

[22] Filed: Aug. 19, 1996

[30] Foreign Application Priority Data

Aug. 25, 1995 [DE] Germany .................. 195 31 332.1

[51] Int. Cl.⁶ ...................................................... G09F 3/02
[52] U.S. Cl. ..................... 428/207; 428/192; 428/195; 428/206; 428/346; 203/71; 203/74; 203/100
[58] Field of Search ................... 428/193, 411.1, 428/204, 192, 422.9, 206, 207, 346; 283/71, 74, 100

[56] References Cited

U.S. PATENT DOCUMENTS

| 5,489,639 | 2/1996 | Faber et al. ........................... | 524/417 |
| 5,501,733 | 3/1996 | Macaudiere et al. .................. | 106/461 |
| 5,648,408 | 7/1997 | Babler ................................... | 523/333 |
| 5,667,580 | 9/1997 | Babler ................................... | 106/499 |

FOREIGN PATENT DOCUMENTS

| 0190997 | 10/1995 | European Pat. Off. . |
| 3917294 | 11/1990 | Germany . |
| 4027192 | 4/1992 | Germany . |

OTHER PUBLICATIONS

DE–Z: neue verpackung, Nov. 1991. pp. 20–22 (in German).
DE–Z: neue verpackung, Jan. 1994, p. 38 (in German).

Primary Examiner—Richard Weisberger
Attorney, Agent, or Firm—Sprung Kramer Schaefer & Briscoe

[57] ABSTRACT

Use of labels for labelling rubber parts, in particular tires, comprising a) a base layer comprising a laser-inscribable, co-vulcanizable, pale rubber blend which b) contains an additive which produces a color change on laser irradiation, c) is, if desired, covered by a protective covering which is transparent in the visible region and in the near IR region, and d) is, if desired, coated on one side with a self-adhesive composition which e) is, if desired, covered by a release paper or a release film.

14 Claims, 1 Drawing Sheet

USE OF LABELS FOR THE LABELLING OF RUBBER PARTS, IN PARTICULAR TIRES

DESCRIPTION

The invention relates to the use of labels for the labelling of rubber parts, in particular tires, whose base layer comprises a covulcanizable, pale rubber mixture which can be inscribed by means of a laser, in particular a solid-state or $CO_2$ laser. The desired contrast between the base material and the inscription is produced by means of a color change without or with minimal removal of material.

BACKGROUND OF THE INVENTION

The inscription and labelling of materials with the aid of lasers is a widely used process. During the inscription operation, material is removed from the material to be inscribed. If a thin top layer of a different color is removed from a base layer, high-contrast inscriptions can be produced. Laser-inscribable materials of this type are distinguished by a two- or multilayer structure comprising thin top layers and thicker base layers, where the individual color layers should have maximum contrast. These materials are used, in particular, in the production of labels, signs and fittings.

German Patent DE 29 36 926 discloses a process for the production of identical plastic parts provided with various symbols using high-energy radiation. To this end, a filler which can be changed in color on exposure to energy radiation is admixed with the plastic of the base material. The surface of the standard parts is subsequently exposed to the energy radiation. The corresponding action of the radiation on the filler, for example a commercially available pigment powder which reacts to heat radiation, results in a permanent color change. The filler itself is in this case responsible for the desired color change, since it undergoes a photochemical reaction on exposure to the energy radiation, usually resulting in decomposition of the filler. The result of this, if the process is used for the labelling of rubber parts, which are generally black, with labels comprising plastics on a rubber base, is inscriptions with low contrast. In addition, the admixing of colorants of this type into the rubber is somewhat undesired.

German Patent DE 30 44 722 proposes using carbon black or graphite as fillers. The fillers carbon black or graphite produce a dark, usually black coloration of the plastic employed. If labels comprising a mixture of plastic containing said additives are inscribed by means of a laser, it is again only possible to achieve an inscription with very low contrast, which does not ensure reliable and rapid reading of the inscribed symbol(s). In particular when these fillers are used in rubber blends, which are usually colored black, it is obvious that the inscription produced only has extremely low contrast. Furthermore, the material is damaged to a certain extent on the surface during the laser treatment, since the carbon black or graphite particles preferentially absorb the radiation, so that destruction of the surface structure of the plastic parts takes place. This impairs at least the visual impression, but in addition represents potential points of attack for subsequent material destruction.

European Patent Application EP 0 190 997 discloses a process for the inscription of high-molecularweight, organic material which contains at least one radiation-sensitive additive which causes a color change. The additive comprises at least one inorganic and/or organic pigment and/or polymer-soluble dye. The labelling is carried out using a laser whose radiation wavelength is in the near UV, near IR or visible region. One of the high-molecular-weight organic materials proposed is rubber. However, the additives and colored pigments disclosed can only be used to a restricted extent, . or not at all, in standard rubber blends, which are generally colored black. The dark inscription, produced owing to the color change, on a black background means that only low-contrast and in some cases only temporarily legible inscriptions are produced, which are inadequate for practical use, such as permanent labelling and legibility.

The color change by laser irradiation is caused by a photochemical reaction of the additive and colored pigment, i.e. a change thereto. There is no destruction or change of the actual plastic by the laser. This is also confirmed by the applicant, as made clear in the granting and opposition proceedings for the application.

German Patent Application DE 39 17 294 discloses the production of moulding compositions, semi-finished products and finished parts comprising high-polymeric material which can be marked and/or inscribed by means of laser light. The material contains, inter alia, an additive which has only a weak inherent color, or none at all, in the visible spectral region and produces a mark of high color contrast in the visible spectral region on exposure to laser light whose wavelength is outside the visible region. Suitable additives mentioned are copper hydroxide phosphate, molybdenum (VI) oxide and titanium oxide as the additive causing the color change. However, the laser-inscribable high-polymeric materials described are unsuitable for use as labels for vulcanized or unvulcanized rubber articles, since they act as foreign bodies and directly restrict the intended use of the rubber articles.

The inscription or labelling of industrial parts which predominantly comprise rubber, for example tires, mouldings, vibration absorbers or profiles, is only possible to a limited extent using the methods known hitherto. Labels of the known type must usually be stuck to such parts if there is to be clear labelling of the part in question. The problem arises here of inadequate adhesion of the label, in particular if the part is subjected to high stresses during its use, for example in the case of tires on an automobile. Life-long labelling of the corresponding rubber part thus cannot be guaranteed. Furthermore, in particular, continuous labelling before, during and after the vulcanization process of the rubber part is not possible using a known label. In addition, the two- or multilayer laser-inscribable lasers known today have further disadvantages which additionally restrict their use for the labelling of industrial rubber parts. Thus, in particular, the interlaminate adhesion between the successively applied layers represents a weak point which can only be improved by means of specific production methods and/or additives in the formulations so that adequate interlayer adhesive strength allows the label to be used for demanding applications.

The object of the invention was to overcome these problems, in particular to improve the labelling of rubber parts using a label comprising a laser-inscribable, covulcanizable, pale rubber blend in such a way that the disadvantages of the prior art do not occur, or at least not to the same extent.

SUMMARY OF THE INVENTION

The invention proposes achieving this object by using labels having a base layer comprising a laser-inscribable, covulcanizable, pale rubber blend containing an additive which produces a color change on laser irradiation, as characterized in greater detail in the claims.

These labels are characterized by a base layer comprising a rubber blend which, in addition to inscrib-ability by a laser, has the properties of itself being vulcanizable and in particular being covulcanizable together with the rubber part to be labelled, and that they have a pale color. In addition, the base layer contains an additive which produces a color change on laser irradiation.

The base layer can, if desired, be coated on one side with a self-adhesive composition, in particular a vulcanizable rubber adhesive composition, which can itself be covered by a release paper or a release film. The base layer can have a transparent protective covering, preferably of polyester, polyamide, perfluorinated polymers or polyimide, if the film also passes through the label vulcanization process together with the corresponding rubber part in order to protect against any soiling of the base layer. Depending on the application of the label, subsequent removal of the protective film is possible.

In particular to prevent diffusion of plasticizers or similar constituents of the rubber blend from the rubber part into the label after the vulcanization process, in which a permanent bond is produced between the label and the rubber part to be labelled, the label, with the exception of the side to be inscribed by exposure to laser radiation, can be provided with a barrier layer, preferably on all sides. This barrier layer comprises, in particular, polyamide or a vapor-deposited metal coating, preferably aluminium. Further embodiments of these barrier layers are thin layers known from the film industry, such as $SiO_x$ barrier layers or polyvinylidene chloride (PVDC) films.

DETAILED DESCRIPTION

Figure 1:
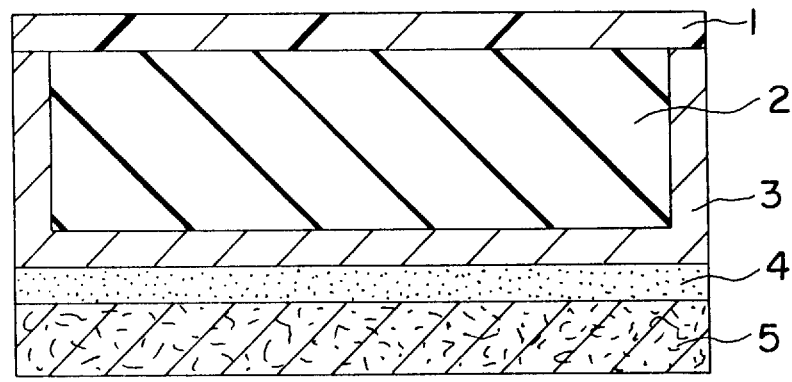

The base material employed for this rubber blend is a rubber, preferably a blend of synthetic rubbers, for example SBR, butyl or EPDM rubber. In addition, however, it is also possible to use natural rubber, if desired also in a blend with synthetic rubber, or a pure synthetic rubber. An additive which produces a color change on laser irradiation is added to this rubber or rubber blend. The rubber may in addition be blended with conventional additives, such as anti-ageing agents, cross-linking agents, light stabilizers, ozone stabilizers, zinc oxide, fatty acids, resins, plasticizers or accelerators.

Suitable additives for producing the color change are, in particular, colored pigments and metal salts, in particular copper hydroxide phosphate, as described in DE-A 39 17 294, or alternatively coated pearlescent pigments, such as such as those available from Merck Company under the trademark—IRIODIN®. These additives are added to the rubber in an amount in the order of from 0.1 to 10% by weight, in particular from 0.5 to 5% by weight.

In order to provide the label with a certain dimensional stability, the base layer can be pre-cross-linked by UV radiation, electron beam curing, or by thermal or chemical means. Alternatively or in addition, a fabric can be incorporated into the base layer.

The actual label without protective film, release paper and self-adhesive composition can have a thickness of from 10 to 2500µm, in particular from 100 to 1000.

The advantages of using labels made from the disclosed rubber blend are that it is now possible to use labels to inscribe or label industrial rubber parts, such as tires, mouldings, vibration absorbers or profiles, permanently with very good contrast, which results from the difference between the dark inscription and the otherwise pale rubber blend, with, inter alia, letters, numbers, logos, bar codes or ID matrix codes. The inscription selected can be read by an observer without further aids, and also by machine, for example using a scanner. The labels can be applied to the rubber part either before vulcanization or after vulcanization thereof. The high abrasion resistance of the material ensures labelling for the en tire life.

In addition, the labelling of rubber parts by labels which are strongly bonded directly into the material has the advantage over the labels known hitherto that the loss of valuable information due to unintentional detachment or premature removal of the label cannot occur.

A particularly advantageous use of novel labels is in the production of tires.

The trend in the tire industry is towards each tire having a preferred running direction, so that the tire can no longer, as customary today, be placed anywhere on the vehicle. The tire production process determines the side of the vehicle on which the tire must be used. This requires clear labelling of each tire so that incorrect mounting is later excluded.

Clear labelling which is very easily read by an observer and/or can be read by machine is possible with the aid of the novel labels.

In tire production, the label, which predominantly comprises the same material as the green tire and may already have been inscribed, is stuck to the green tire before the vulcanization process or applied in the vulcanization mould.

In the advantageous embodiment of the label having a self-adhesive coating, very reliable positioning of the label on the desired point of the green tire if the inherent tack of the green tire and of the label is not sufficient for reliable fixing. Undesired slipping of the label is thus excluded. Any release paper present or a release film is peeled off from the adhesive coating in advance.

The label is subsequently vulcanized together with the tire, which at this time still comprises uncrosslinked crude rubber, in the vulcanization mould. This produces a permanent bond between the label and the tire and thus labelling of the tire for its entire life, in particular if the adhesive coating provided comprises a rubber adhesive composition which can also be vulcanized.

Since the label has virtually the same homogeneous material properties and thus even the same chemical and mechanical properties as the material of the tire, there is no reduction in the life of tires owing to premature detachment of the label from the remainder of the system, since no sudden changes in properties and thus potential weak points are encountered at the interface between the label and the rubber part.

After the vulcanization process, the finished tire is transferred to an appropriate apparatus in which the label inscription desired individually is carried out using a laser. Thus, for example, the batch number and the respective description of the tire can be applied.

The inscription of the novel labels comprising the rubber blend can take place with the aid of Nd-YAG solid-state lasers, in particular at a wavelength of 1064 nm, and $CO_2$ lasers. However, inscription using DPY lasers or using laser diodes which emit at wavelengths of from 700 to 2000 nm is also possible.

In principle, however, inscription before application of the label to the green tire is possible.

At the point where the laser hits the material surface, the respective additive, for example copper hydroxide phosphate, absorbs the energy. This results in considerable evolution of heat in the immediate vicinity of the irradiated particle through absorption of the high-energy radiation, so that carbonization of the adjacent polymer matrix takes place. The label rubber blend, which is pale colored principally through admixing of titanium dioxide, changes its color to grey/black shades, depending on the amount of energy used, in the region of the carbonization that has occurred. This color change in the irradiated areas of the label produces sharp, high-contrast inscriptions or labellings. On the other hand, however, the threshold value for this process is so high that an unintentional color change owing to UV radiation or exposure to heat does not occur.

A desired text or any desired symbols can be transferred to the material using Galvano image system or alternatively masks.

After vulcanization of both the tire and label, diffusion processes of plasticizers, antiageing agents or crosslinking agents from the tire into the inscribed label cannot be excluded. These chemicals discolor the label so strongly that the contrast between the character and the background becomes increasingly blurred, so that the inscription on the label can only be read for a certain time.

If permanent legibility of the label is necessary, the label can be provided with a barrier layer before vulcanization with the tire. Diffusion is prevented virtually completely if the label is provided with a barrier layer of this type on all sides with the exception of the inscribed side.

This barrier layer can comprise, inter alia, polyamide or a barrier layer vapour-deposited onto the label, preferably a metal layer, for example aluminium, or of vapour-deposited $SiO_x$. The polyamide layer can be applied either by coating with a suitable liquid formulation with subsequent drying and curing, preferably in a thickness of from 1 to 20 μm, or by lamination with a film having a thickness of, preferably from 5 to 25 μm.

FIG. 1 shows a novel label in its preferred embodiment. The label has a protective covering 1 of, for example, polyester. The base layer 2 is surrounded substantially on all sides by a barrier layer 3. In order to ensure that the label sticks to, for example, the green tire, a self-adhesive coating 4 is provided which is itself covered by a release film 5.

Figure 2:
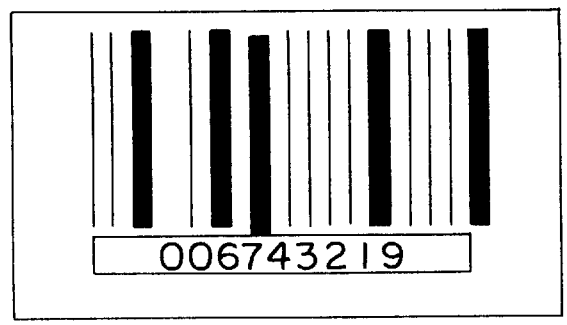

FIG. 2 shows one possibility of inscription with a bar code and a clear text. The bar code is machine-readable.

The invention is described below with reference to a number of examples, but without wishing unnecessarily to restrict the invention thereby.

EXAMPLE 1

The laser-inscribable rubber blend is composed of the following components:

|  | % by weight |
|---|---|
| Rubber blend of natural rubber and SBR rubber in the ratio 2:1 | 60 |
| Silicic acid | 25 |
| Paraffinic plasticizers | 4 |
| Zinc oxide | 3.5 |
| Titanium dioxide | 3 |
| VESTODUR FP LAS ® from Hüls AG | 0.3 |
| Hostasingelb HR ® coloured pigment from Hoechst AG | |
| Antiageing agent, accelerator, sulphur, crosslinking agent, release agent, inhibitor in total | 3.2 |

The laser-inscribable rubber blend is prepared in two steps, namely premixing and main mixing.

Firstly, the raw materials are weighed out accurately into polyethylene transport containers using a top-pan balance for introduction into the compounder.

For the premixing, the natural rubber, which has been stored at 60°C. for 72 hours, and the SBR are introduced into a Werner & Pfleiderer compounder with intermeshing shafts and a maximum speed of $V_{max}$=45 rpm. The weighed-out raw materials, the silicic acid, the paraffinic plasticizers, the zinc oxide, the titanium dioxide, the Vestodur FP LAS®, the Hostasingelb HR®, the antiageing agent, the accelerator, the sulphur, the crosslinking agent, the release agent and the inhibitor are added. The compounding time is 6½ minutes at a compounding temperature of 120°C. The mixture then runs into the mixing rolls, which takes less than 2½ minutes. Work-up with the roll-mill is carried out for 9½ minutes at a refiner roll temperature of 70°C. and a maximum roll speed of $V_{max}$=55 rpm.

After the cooling phase, the premix is again fed to the compounder rolls for the main mixing. Firstly, the raw materials activator, accelerator and crosslinking agent are introduced into the compounder, with the compounding time being 3½ minutes at a compounding temperature of 90°C. The main mixture is then run into the mixing rolls for a total of 2½ minutes. The work-up in the roll-mill takes 9 minutes.

The compounded mixture is then calendered in a calender (Werner & Pfleiderer, 3-roll S-calender). The mixture is re-compounded in the calender and forced through roll pairs with adjustable nip widths, the nip width being set so that a calender sheet with a thickness of 1 mm is produced. The sheeted-out compound is wound onto a spool together with a polyethylene cover film with a thickness of 50 μm. For partial pre-crosslinking, the rubber sheet is irradiated with 40 kGy in an electron beam curing unit. Finally, labels measuring 40×70 mm are stamped out of the sheet and presented on rolls.

Finally, the barrier layer, the adhesive and the cover paper are applied to the label. The label is firstly coated with 5 g/m² of an ethanolic polyamide formulation, the adhesive coating comprising a vulcanizable rubber contact adhesive conforming to the prior art, which reinforces the temporary fixing of the label to rubber parts, is applied, and, after the adhesive has dried, the release paper, a sodium kraft paper coated with silicone on one side, is laminated on.

The inscription of the label with a bar code and a clear text before the vulcanization process is carried out using an Nd-YAG solid-state laser with a Galvano image system with the following inscription parameters:

| Power | 30 watts |
|---|---|
| Q-frequency | 12 kHz |
| Speed | 900 mm/s |
| Flat-field optical system with f | 160 |

The tesa Label Laser from Beiersdorf AG, for example, can be selected for this purpose.

The label produced in this way is stuck onto the green tire before vulcanization and passes through the remaining process steps together therewith. The sharp, high-contrast inscription of the label allows reliable, automatic readability for identification of the tire and control of production and logistics.

EXAMPLE 2

The composition of the rubber blend for the labels and the production process as far as and including stamping-out of the labels from the sheeted-out compound conform to those from Example 1.

After the stamping-out, a barrier layer is formed on the label by vapour-deposition of an aluminium layer in a thickness of 100 nm. A vulcanizable rubber contact adhesive conforming to the prior art is then coated onto the barrier layer as adhesive for temporary fixing of the label to rubber parts. A transparent PEN film with a thickness of 25 µm is laminated on as protection against soiling of the label surface.

What is claimed is:

1. A label suitable for labelling rubber parts, formed from a rubber blend which is covulcanizable with the rubber parts being labelled and which contains an additive that produces a color change upon being irradiated with laser energy.

2. The label of claim 1, wherein said rubber blend is a blend of two or more members of the group consisting of SBR, butyl EPDM and natural rubbers.

3. The label of claim 1, wherein said additive that produces a color change when irradiated with laser energy is copper hydroxide phosphate or a coated pearlescent pigment.

4. The label of claim 1 having a self-adhesive coating on one surface thereof.

5. The label of claim 4, wherein said adhesive coating is covered by a release film.

6. The label of claim 1, wherein said rubber blend further comprises titanium dioxide in an amount sufficient to impart a pale color to said rubber blend.

7. The label of claim 1 in the form of a flat sheet having a first side, a second side and four edges, the first side of said label optionally being provided with a protective covering which is transparent to light in the visible region and the near IR region, the second side and the four edges optionally being coated with a barrier layer, the barrier layer on second side being optionally followed by a self-adhesive coating, on said barrier layer and optionally a protective coating on said self-adhesive coating.

8. A tire bearing a label according to claim 1.

9. The label of claim 7, wherein said self-adhesive coating is a vulcanizable rubber adhesive composition.

10. The label of claim 7, wherein said protective coating comprises polyester, polyamide, polyfluorinated polymers, polyolefins or polyamide.

11. The label of claim 1, wherein said label is pre-cross-linked by U.V. radiation, electron beam curing, thermal means, chemical means, is provided with a fabric, or a combination thereof.

12. The label of claim 3, wherein said additive is present in an amount of from 0.1 to 10% by weight of blend.

13. The label of claim 7, wherein said barrier layer comprises polyamide or polyvinylidene chloride or is a vapor-deposited barrier layer of aluminum or a silicon oxide.

14. The label of claim 1 further comprising antiaging agents, cross-linking agents, light stabilizers, zinc oxide, fatty acids, plasticizers, accelerators or a combination thereof.

* * * * *